United States Patent
Waffenschmidt et al.

(10) Patent No.: US 9,941,930 B2
(45) Date of Patent: Apr. 10, 2018

(54) CONDUCTIVE LAYER OF A LARGE SURFACE FOR DISTRIBUTION OF POWER USING CAPACITIVE POWER TRANSFER

(75) Inventors: Eberhard Waffenschmidt, Aachen (DE); Theodorus Johannes Petrus Van Den Biggelaar, Veldhoven (NL); Adrianus Sempel, Waalre (NL); Oscar Hendrikus Willemsen, Den Bosch (NL); Dave Willem Van Goor, Nederweert eind (NL); Henricus Theodorus Van Der Zanden, Sint-Oedenrode (NL); Maarten Marinus Johannes Wilhelmus Van Herpen, Heesch (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 737 days.

(21) Appl. No.: 14/237,902

(22) PCT Filed: Aug. 13, 2012

(86) PCT No.: PCT/IB2012/054106
§ 371 (c)(1),
(2), (4) Date: Apr. 9, 2014

(87) PCT Pub. No.: WO2013/024417
PCT Pub. Date: Feb. 21, 2013

(65) Prior Publication Data
US 2014/0292103 A1  Oct. 2, 2014

Related U.S. Application Data

(60) Provisional application No. 61/523,939, filed on Aug. 16, 2011, provisional application No. 61/523,955, (Continued)

(51) Int. Cl.
H02M 3/06 (2006.01)
H04B 5/00 (2006.01)
(Continued)

(52) U.S. Cl.
CPC ............. *H04B 5/0012* (2013.01); *G09G 5/00* (2013.01); *H02J 50/05* (2016.02); *H02J 50/12* (2016.02);
(Continued)

(58) Field of Classification Search
CPC ......... H04B 5/0012; H04B 5/00; H02J 5/005; H02J 5/00
(Continued)

(56) References Cited

U.S. PATENT DOCUMENTS 6,477,035 B1  11/2002  Cepas et al.
2004/0022058 A1  2/2004  Birrell
(Continued)

FOREIGN PATENT DOCUMENTS

JP  2009089520 A  *  4/2009
JP  2009089520 A     4/2009
(Continued)

*Primary Examiner* — Fritz M Fleming
*Assistant Examiner* — Jagdeep Dhillon

(57) ABSTRACT

An article of manufacture for supplying a power to a load connected in a capacitive power transfer system comprises a sheet (210) of a non-conductive material; and a plurality of conductive stripes (220), each two adjacent conductive stripes being electrically insulated from each other, wherein the sheet forms an insulating layer of the capacitive power transfer system and the plurality of conductive stripes form at least a pair of transmitter electrodes of the capacitive power transfer system.

13 Claims, 8 Drawing Sheets

Related U.S. Application Data filed on Aug. 16, 2011, provisional application No. 61/645,175, filed on May 10, 2012, provisional application No. 61/657,998, filed on Jun. 11, 2012.

(51) Int. Cl.
*G09G 5/00* (2006.01)
*H02J 50/12* (2016.01)
*H02J 50/05* (2016.01)
*H02J 7/00* (2006.01)
*H02J 7/02* (2016.01)

(52) U.S. Cl.
CPC .......... *H04B 5/0037* (2013.01); *H02J 7/0042* (2013.01); *H02J 7/025* (2013.01)

(58) Field of Classification Search
USPC ................... 307/109, 104, 80, 66; 333/24 R; 345/211, 213
See application file for complete search history.

(56) References Cited

U.S. PATENT DOCUMENTS

| | | | |
|---|---|---|---|
| 2004/0103808 A1* | 6/2004 | Lochun | B41M 1/02 101/483 |
| 2008/0125035 A1 | 5/2008 | Dellantoni et al. | |
| 2008/0147350 A1 | 6/2008 | Jean | |
| 2009/0161040 A1* | 6/2009 | Khan | G02F 1/133603 349/69 |
| 2009/0184950 A1* | 7/2009 | Furuta | H02J 5/005 345/211 |
| 2009/0302690 A1 | 12/2009 | Kubono et al. | |
| 2010/0087143 A1 | 4/2010 | Bonin | |
| 2010/0201201 A1 | 8/2010 | Mobarhan et al. | |
| 2010/0201202 A1 | 8/2010 | Kirby et al. | |
| 2011/0068296 A1* | 3/2011 | Huang | H01M 4/136 252/182.1 |
| 2011/0090030 A1* | 4/2011 | Pagani | H04B 5/0012 333/24 R |
| 2012/0015176 A1* | 1/2012 | Riebel | B32B 27/06 428/323 |

FOREIGN PATENT DOCUMENTS

| | | | |
|---|---|---|---|
| JP | 2010063213 A | * | 3/2010 |
| JP | 2010063213 A | | 3/2010 |
| JP | 2010213554 A | * | 9/2010 |
| JP | 2010213554 A | | 9/2010 |
| WO | 2010070914 A1 | | 6/2010 |

* cited by examiner

CONDUCTIVE LAYER OF A LARGE SURFACE FOR DISTRIBUTION OF POWER USING CAPACITIVE POWER TRANSFER

This application claims the benefit of U.S. provisional patent application No. 61/523,939 and U.S. provisional application No. 61/523,955, both filed on Aug. 16, 2011, U.S. provisional application No. 61/645,175, filed on May 11, 2012 and U.S. provisional application No. 61/657,998, filed on Jun. 11, 2012, The invention generally relates to capacitive power transfer, and more particularly to implementing a conductive layer over a large surface for power distribution using capacitive power transfer.

A wireless power transfer refers to the supply of electrical power without any wires or contacts, whereby the powering of electronic devices is performed through a wireless medium. One popular application for contactless powering is for the charging of portable electronic devices, e.g., mobiles phones, laptop computers, and the like.

One implementation for wireless power transfers is by an inductive powering system. In such a system, electromagnetic inductance between a power source (transmitter) and the device (receiver) allows for contactless power transfers. Both the transmitter and receiver are fitted with electrical coils, and when brought into physical proximity an electrical signal flows from the transmitter to the receiver.

In inductive powering systems, the generated magnetic field is concentrated within the coils. As a result, the power transfer to the receiver pick-up field is very concentrated in space. This phenomenon creates hot-spots in the system which limits the efficiency of the system. To improve the efficiency of the power transfer, a high quality factor for each coil is needed. To this end, the coil should be characterized with an optimal ratio of an inductance to resistance, be composed of materials with low resistance, and fabricated using a Litz-wire process to reduce skin-effect. Moreover, the coils should be designed to meet complicated geometries to avoid Eddy-currents. Therefore, expensive coils are required for efficient inductive powering systems. A design for contactless power transfer system for large areas would necessitate many expensive coils, whereby for such applications an inductive powering system may not be feasible.

Capacitive coupling is another technique for transferring power wirelessly. This technique is predominantly utilized in data transfer and sensing applications. A car-radio antenna glued on the window with a pick-up element inside the car is an example of a capacitive coupling. The capacitive coupling technique is also utilized for contactless charging of electronic devices. For such applications, the charging unit (implementing the capacitive coupling) typically operates at frequencies outside the inherent resonance frequency of the device. In the related art, a capacitive power transfer circuit that enables LED lighting is also discussed. The LED lighting circuit is based on an inductor in the power source (driver). As such, only a single receiver can be used and the transmitter frequency should be tuned to transfer the maximum power. In addition, such a circuit requires pixelated electrodes which ensure power transfer between the receiver and transmitter even when they are not perfectly aligned. However, increasing the number of the pixelated electrodes increases the number connections to the electrodes, thereby increasing the power losses. Thus, the capacitive power transfer circuit discussed in the related art, having only a single receiver and limited size electrodes, cannot supply power over a large area, e.g., windows, walls, and so on. In addition, even if the power were available over a large surface, there would be the challenge of providing the power over any type of surface and to have the power available at any arbitrary position on the surface.

Therefore, it would be advantageous to provide a low cost and feasible solution for wireless powering applications over large areas. It would be further advantageous if such a solution would provide the ability to allow supplying the power at any point on a surface desirable to a user.

Certain embodiments disclosed herein include an article of manufacture for supplying a power to a load connected in a capacitive power transfer system. The article of manufacture comprises a sheet (210) of a non-conductive material; and a plurality of conductive stripes (220), each two adjacent conductive stripes being electrically insulated from each other, wherein the sheet forms an insulating layer of the capacitive power transfer system and the plurality of conductive stripes form at least a pair of transmitter electrodes of the capacitive power transfer system.

Certain embodiments disclosed herein also include an article of manufacture (1300) for supplying a power to a load connected in a capacitive power transfer system. The article of manufacture comprises an insulating surface (1360) having a width and a length; a first segment (1310) made of an electricity conducting material affixed to a length of a first edge of the insulating surface (1360); a second segment (1320) made of an electricity conducting material affixed to a length edge of the insulating surface (1360) opposite edge of the first edge, the second segment (1320) being electrically isolated from the first edge; wherein that the first segment (1310) is connected to an electric potential of a first polarity and the second segment (1310) connected to an electric potential of a second polarity that is opposite to the first polarity, wherein the first and second segments form at least a pair of transmitter electrodes of the capacitive power transfer system.

Certain embodiments disclosed herein also include an article of manufacture for supplying a power to a load coupled to a capacitive power transfer system. The article of manufacture comprises an insulating surface (1110); a segment (1150) made of an electricity conducting material affixed to the insulating surface, the segment forming a first electrode of a transmitter of the capacitive power transfer system; a first supply line (1120) connected to the segment; and a second supply line (1130), wherein the first supply line and second supply line intersect (1140) without electrically connecting to allow for alternate potential connection to another segment of an abutting article of manufacture for supplying a power grid for a capacitive power, the another segment forming a second electrode of the transmitter of the capacitive power transfer system.

Certain embodiments disclosed herein also include an article of manufacture for supplying a power to a load connected in a capacitive power transfer system. The article of manufacture comprises a plurality of insulating layers made of a non-conductive material; and at least a pair of conductive layers made of an electricity conducting material, wherein the plurality of conductive layers are isolated from each other by one of the plurality of insulating layers, wherein a first conductive layer of the pair of conductive layers is connected to an electric potential of a first polarity and the second conductive layer of the pair of conductive layers is connected to an electric potential of a second polarity that is opposite to the first polarity, wherein the pair of conductive layers form at least a pair of transmitter electrodes of the capacitive power transfer system.

The subject matter that is regarded as the invention is particularly pointed out and distinctly claimed in the claims at the conclusion of the specification. The foregoing and other features and advantages of the invention will be apparent from the following detailed description taken in conjunction with the accompanying drawings.

FIG. 1 shows a capacitive power system utilized to describe various embodiments of the invention;

Figure 15:
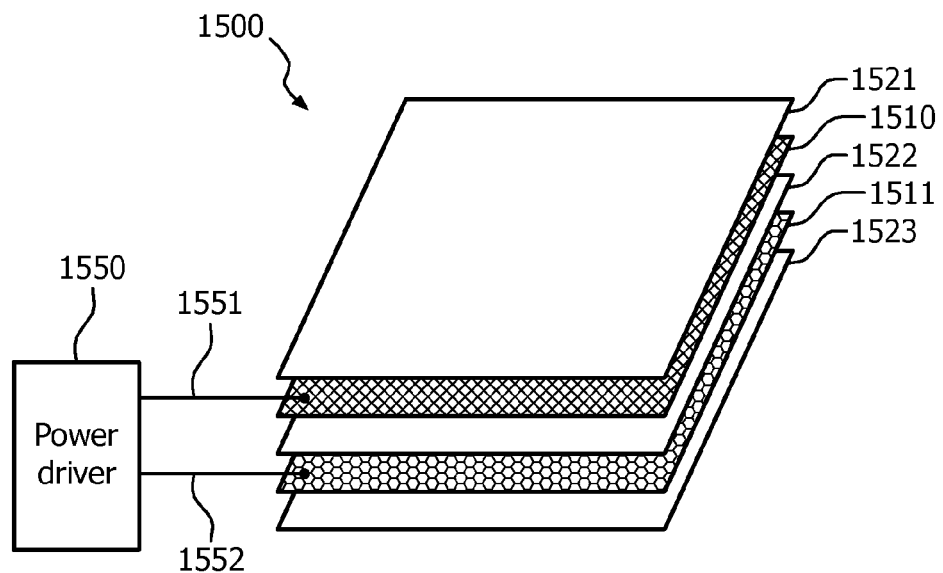
Figure 16:
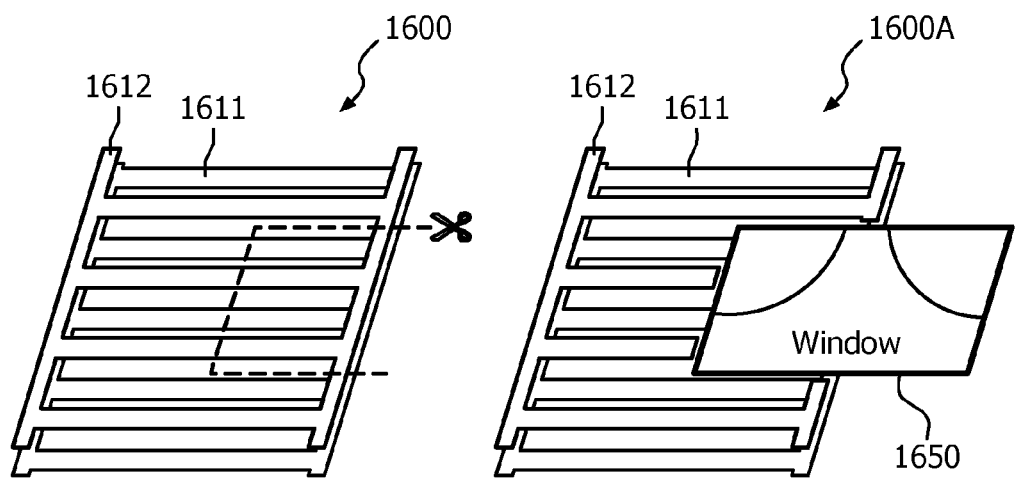

FIG. 15 schematically shows a structure of a multi-electrode layer according to one embodiment; and FIG. 16 schematically shows a customized multi-electrode layer.

It is important to note that the embodiments disclosed are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality. In the drawings, like numerals refer to like parts through several views.

Figure 1:
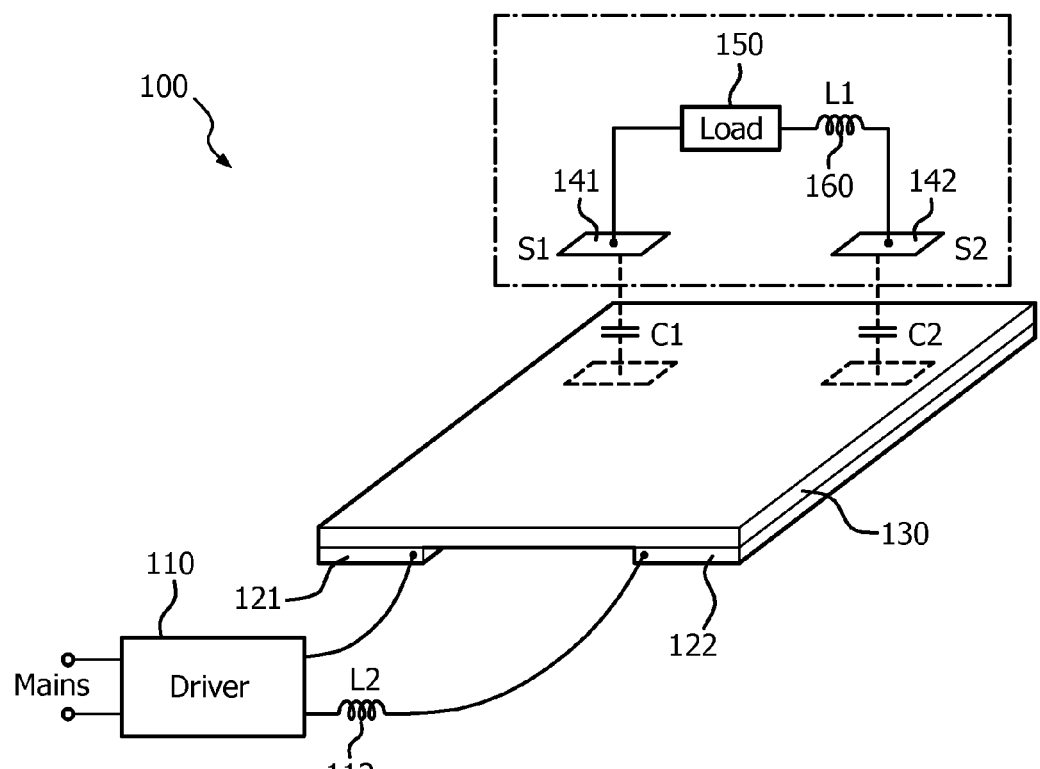

FIG. 1 shows an exemplary and non-limiting schematic diagram of a capacitive powering system 100 utilized to describe various embodiments of the invention. The system 100 enables power transmissions over a large area. The system 100 can be installed in places where open electrical contacts are not preferred or not desirable, such as bathrooms, retail-shops where regular variations are needed to illuminate a product, furniture, and the like. The system 100 can transfer power over a large area and thus be utilized to power devices mounted on walls, windows, mirrors, floors, seats, aisles, and so on.

The system 100 includes a driver 110 connected to a pair of transmitter electrodes 121 and 122 which are attached to an insulating layer 130. The system 100 also includes a pair of receiver electrodes 141 and 142 connected to a load 150 and an inductor 160. Optionally, the system 100 may include an inductor 112 coupled to the driver 110.

The connection between the transmitter electrodes 121, 122 to the driver 110 is via a galvanic contact or a capacitive in-coupling. A power signal is supplied to the load 150 by placing the receiver electrodes 141, 142 in proximity to the transmitter electrodes 121, 122 without having a direct contact between the two. Thus, no mechanical connector or any electrical contact is required in order to power the load 150. The load 150 may be, but is not limited to, lighting elements (e.g., LED, LED string, a lamp, etc.), organic light emitting diode (OLED) surfaces, displays, computers, power charges, loudspeakers, and the like.

The driver 110 outputs an AC voltage signal having a frequency that substantially matches the series-resonance frequency of a circuit consisting of a series of the capacitors and inductors 112, 160. The capacitors (labeled as C1 and C2 in FIG. 1) are the capacitive impedance of the transmitter electrodes 121, 122 and receiver electrodes 141, 142 (shown in dotted lines in FIG. 1). The impedances of the capacitors and inductor 160 cancel each other at the resonance frequency, resulting in a low-ohmic circuit. Thus, the system 100 is capable of delivering power to the load 150 with very low power losses.

The driver 110 generates an AC signal of which amplitude, frequency, and waveform can be controlled. The output signal typically has an amplitude of tens of volts and a frequency of up to a few Mega Hertz (MHz). Frequency tuning between the generated signal and series-resonance can be performed by changing the frequency, phase, or duty cycle of the signal output by the driver 110. Alternatively, the frequency tuning can be achieved by changing the capacitance or inductive values of the circuit connected to the driver 110.

The insulating layer 130 is a thin layer substrate material that can be of any insulating material, including for example, air, paper, wood, textile, glass, DI-water, and so on. Preferably, a material with dielectric permittivity is selected. The thickness of the insulating layer 130 is typically between 10 microns (e.g., a paint layer) and a few millimeters (e.g., a glass layer).

The transmitter electrodes 121, 122 are comprised of two separate bodies of conductive material placed on one side of the insulating layer 130 that is not adjacent to the receiver electrodes 141, 142. For example, as illustrated in FIG. 1, the transmitter electrodes 121, 122 are at the bottom of the insulating layer 130. In another embodiment, the transmitter electrodes 121, 122 can be placed on opposite sides of the insulating layer 130. The transmitter electrodes 121, 122 can be any shape including, for example, a rectangle, a circle, a square, or combinations thereof. The conductive material of the each of the transmitter electrodes may be, for example, carbon, aluminum, indium tin oxide (ITO), organic material, such as Poly(3,4-ethylenedioxythiophene (PEDOT), copper, silver, conducting paint, or any conductive material. The receiver electrodes 141, 142 can be of the same conductive material as the transmitter electrodes 121, 122 or made of different conductive material.

The total capacitance of the system 100 is formed by the overlap areas of respective transmitter and receiver electrodes 121, 141, and 122, 142, as well as the thickness and material properties of the insulating layer 130. The capacitance of the system 100 is illustrated as C1 and C2 in FIG. 1. In order to allow electrical resonance, the system 100 should also include an inductive element. This inductive element may be in a form of one or more inductors that are part of the transmitter electrodes or the receiver electrodes, distributed over the driver 110 and the load (e.g., inductors 160 and 112 shown in FIG. 1), inductors incorporated within insulating layer 130, or any combination thereof.

The load 150 allows for an AC bi-directional current flow. The load 150 may include a diode or an ACDC converter to locally generate a DC voltage. The load 150 may further include electronics for controlling or programming various functions of the load 150 based on a control signal generated by the driver 110. To this end, in an embodiment, the driver 110 generates a control signal that is modulated on the AC power signal. For example, if the load 150 is an LED lamp, a control signal output by the driver 110 may be utilized for dimming or color setting the LED lamp.

The capacitive powering system 100, as illustrated in FIG. 1, depicts a single load 150 that is powered by the driver 110. However, it should be noted that the driver 110 can also power multiple loads, each of which may be tuned to a different operational frequency. Alternatively, the multiple loads may be tuned to the same operational frequency.

Figure 2:
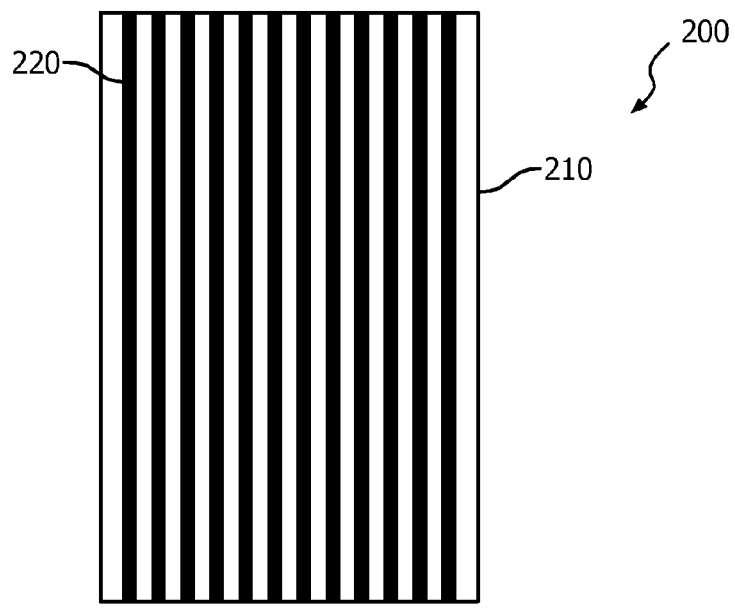
FIG. 2 shows a wallpaper having a backside covered with vertical conductive stripes.

As noted above, the capacitive powering system 110 may be operative in various configurations of an infrastructure including the insulating layer 130 and transmitter. FIG. 2 shows an exemplary and non-limiting diagram of an infrastructure designed according to one embodiment. As depicted in FIG. 2, wallpaper 200 having a backside is covered with vertical conductive stripes 220. The conductive stripes 220 are placed on the back side of the wallpaper material 210 that forms the insulating layer. When the wallpaper 200 is placed on a surface (not shown), for example, a wall, the conductive stripes 220 face that surface while the wallpaper material 210 becomes in fact the insulator layer 130 discussed in greater detail hereinabove. The conductive stripes 220 form the transmitter electrodes 121 and 122 discussed with respect to FIG. 1. The conductive stripes 220 may be made of, for example, conducting ink, conducting paint, and the like. The stripes can be printed or added to the backside of regular wallpaper. Alternatively, the electrodes are placed in separate layers, laminated between an insulating layer, allowing for crossovers between electrodes without creating short-circuits.

Figure 3:
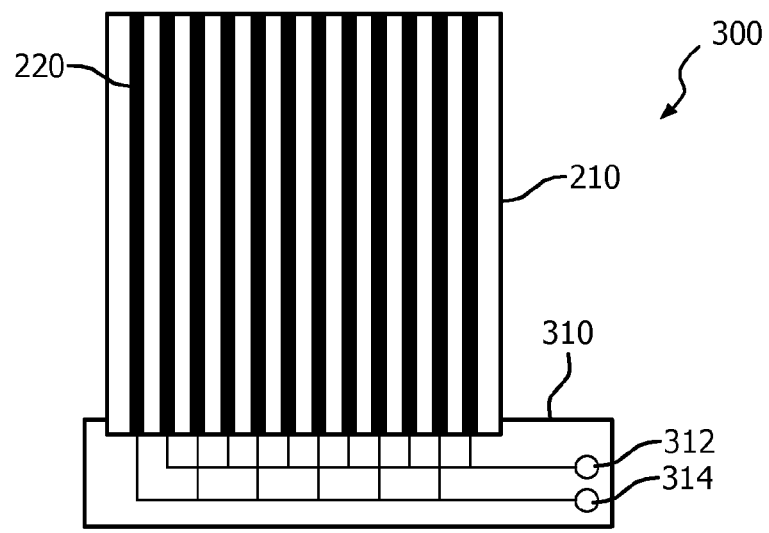
FIG. 3 shows the bottom segment of the wallpaper with a detailed view of the electrical connections.

The connections of the conductive stripes 220 are shown in the exemplary and non-limiting FIG. 3. The connections to the driver 110 (FIG. 1) are provided by interleaving the connections of the conductive stripes 220. That is, a first conductive stripe 220 is connected to a connection 314 while the immediately next conductive stripe 220 is connected to connection 312, and so on and so forth, alternating between the connections to 312 and 314. The connections 312, 314 are part of a connection baseboard 310 designed to be operative with, for example, the wallpaper 200.

Figure 4:
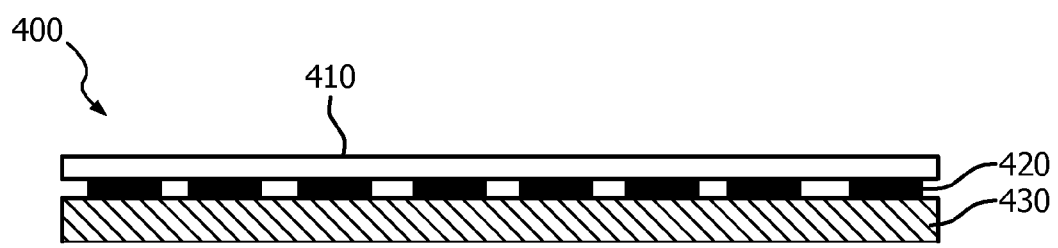
FIG. 4 shows a cross-section of the wall paper.

FIG. 4 shows an exemplary and non-limiting cross-section 400 of the wallpaper 200. The cross-section 400 shows an insulating layer 410 on which a plurality of conductive stripes 420 are provided and which are then, optionally, protected by a protective layer 430. The insulating layer 410 may be provided in a plurality of forms and appear to the observer as a regular wallpaper. The conductive stripes 420 may have a plurality of shapes and made of conductive material as discussed above. The protective layer 430 may include, but is not limited to, a layer containing glue to allow adherence of the wallpaper to a desired surface of choice.

Figure 5:
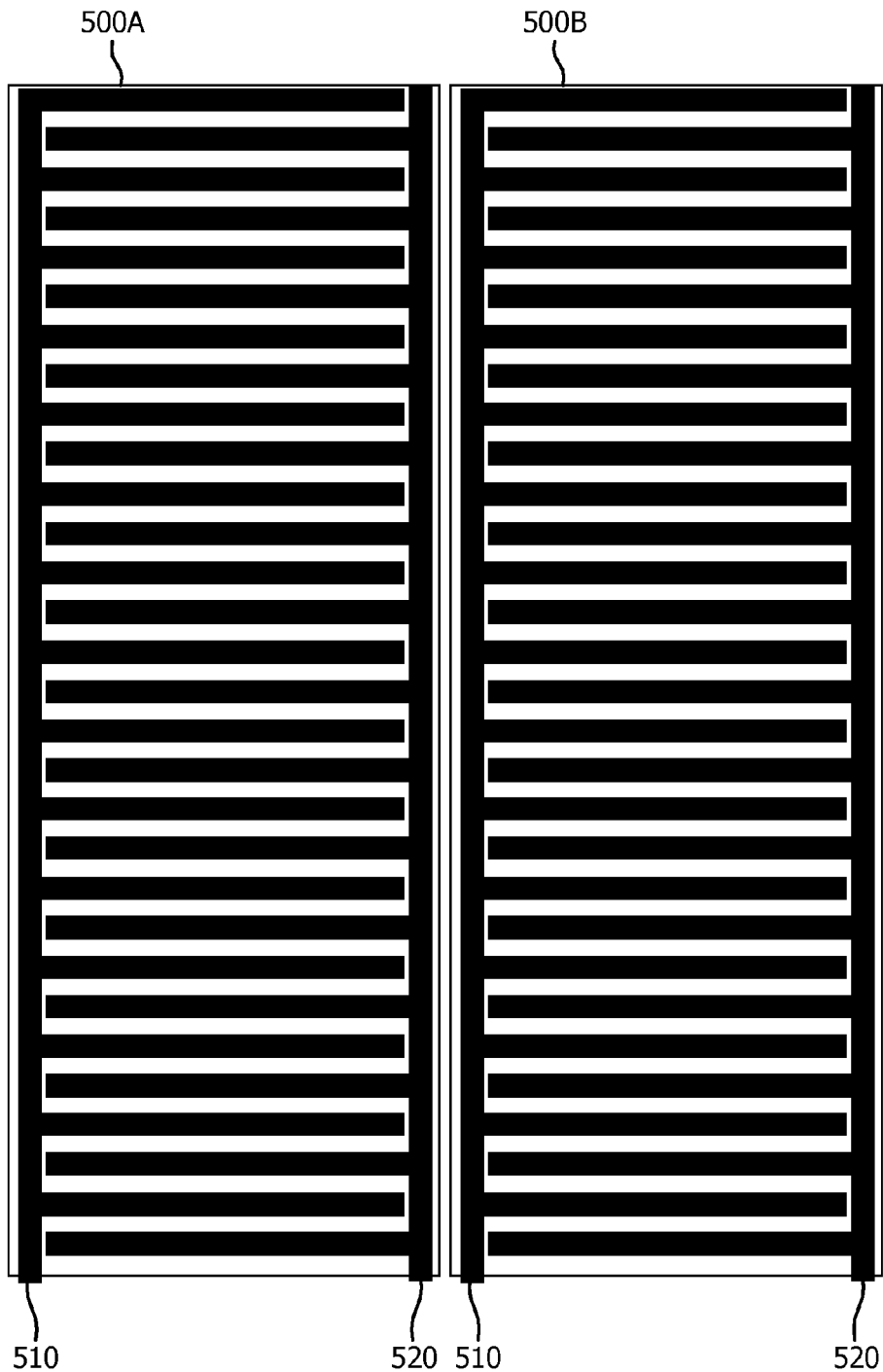
FIG. 5 shows a wallpaper having a backside covered with horizontal conductive stripes and vertical connecting lines.

FIG. 5 shows an exemplary and non-limiting infrastructure of a capacitive powering system designed according to another embodiment. The infrastructure is designed as wallpaper having a backside covered with horizontal conductive stripes and vertical connecting lines. Two sheets of such wallpaper 500A and 500B are shown side-by-side. The electrodes 510 and 520 begin with vertical connection lines that are directed horizontally in opposite directions, so that they interleave with each other resulting in a desired pattern and allowing a horizontal-based wallpaper solution for capacitive power transfer. The structures shown in FIG. 2 and FIG. 3 are designed to allow for wallpaper, that may be cut-to-measure, be connected from the top or the bottom part of the wallpaper, and can optionally share connections between neighboring conducting stripes of neighboring wallpaper sheets. Moreover, a wallpaper manufactured as disclosed herein may be rolled into wallpaper rolls in any desired length and then cut to any customized length, as may be necessary.

It should be noted that power may be provided to the conducting stripes directly by clamping the wallpaper or protruding pins through the paper layer. However, it is also possible to couple the power to the conducting stripes in a capacitive way. To this end, the transmitter electrodes are positioned on the wallpaper. The power transmission principle for injection of the power to the electrodes of the wallpaper is the same principle as the way the power is transferred from the wallpaper electrodes to the power receiver. The advantage of this configuration is that the position of power injection to the wallpaper can be freely chosen, and no damage is done to the cover layer. It should be understood by those of ordinary skill in the art that wallpaper manufactured in this manner may too be manufactured in long sheets that are provided as rolls of wallpaper to be cut appropriately to fit any desired length.

According to another embodiment, segments, e.g., wall segments, are used that are completely made from an electrically conducting metal sheet like Iron, Steel, or Aluminium. These segments are designed to be mounted on a surface such that the alternating electrodes have opposite potentials. Each segment has typically the height of the wall running between the floor and the ceiling. The segment may have a profile designed to achieve mechanical stability.

Figure 6:
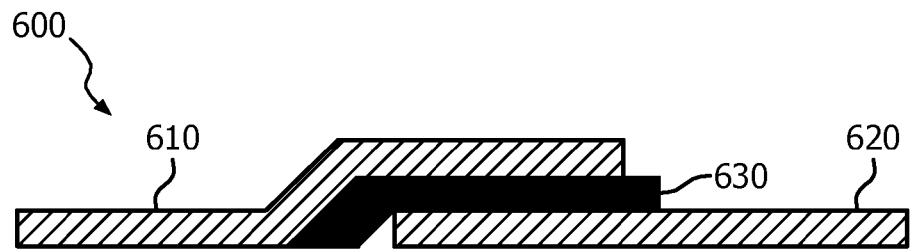
FIG. 6 shows a cross-section of overlapping segments with electrical insulation therebetween.

FIG. 6 depicts an exemplary and non-limiting cross-section 600 of overlapping segments with electrical insulation therebetween structured according to one embodiment. In this embodiment, each segment has a solid profile. The first segment 610 overlaps the second segment 620 and is insulated therefrom by an insulating layer 630. The mechanical connection can be achieved by, for example and without limitation, screws (non-conducting or in electrically insulated holes), glue, magnets, or fabric application (e.g., Velcro®-tape).

Figure 7:
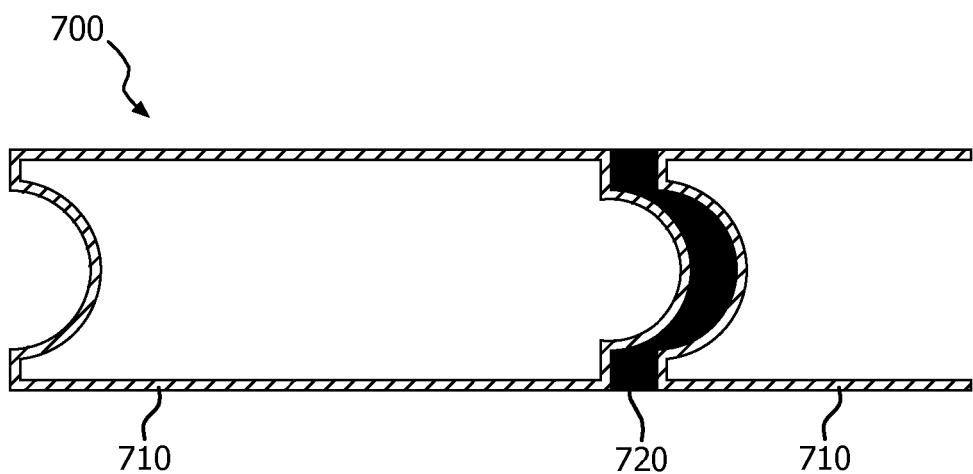
FIG. 7 shows a top view cross-section of hollow segments with an insulator therebetween.
Figure 8:
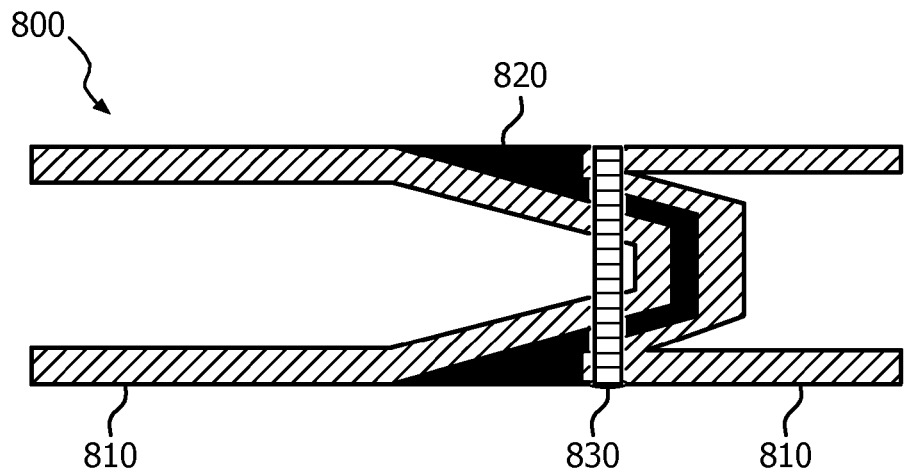
FIG. 8 shows a top view cross-section of hollow segments with an insulator therebetween with an interconnecting pin.

FIG. 7 shows an alternative exemplary and non-limiting top view cross-section 700 of hollow segments with an insulator there between. The edges of each of the hollow profiled segments 710 are designed to interface in a puzzle-like fashion, and having the advantage over the configuration shown in FIG. 6 that both sides can be planar. An insulation layer 720 insulates between the segments. In the exemplary and non-limiting FIG. 8 there is depicted a top view cross-section 800 of hollow segments 810 with an insulator 820 therebetween with an interconnecting pin 830.

Figure 9A:
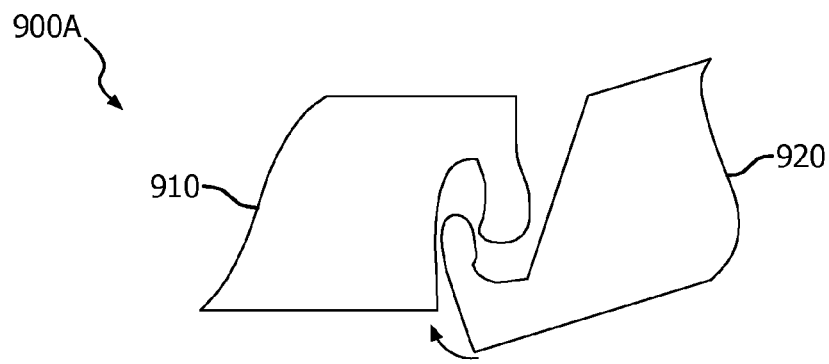
FIG. 9A shows a view of hook-like side profiles of segments to be mounted.
Figure 9B:
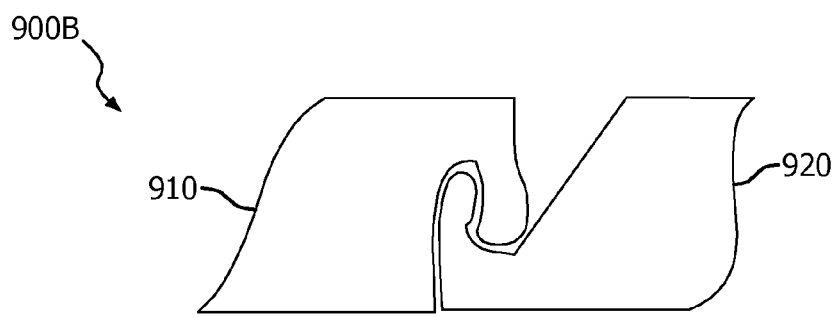
FIG. 9B shows a view of the mounted hook-like segments.

In another embodiment, shown in the exemplary and non-limiting FIGS. 9A and 9B the edges of the segments have a hook-like profile (as shown in 920) and a corresponding cavity (a shown in 910) on the opposite side of the segment. When mounted, the added segment can be attached in a predetermined angle (see FIG. 9A). Once turned straight to correspond with the already mounted segments, the hook-like profile 920 forms a mechanical connection with the cavity 910, which, in one embodiment cannot be released (see FIG. 9B).

Figure 10:
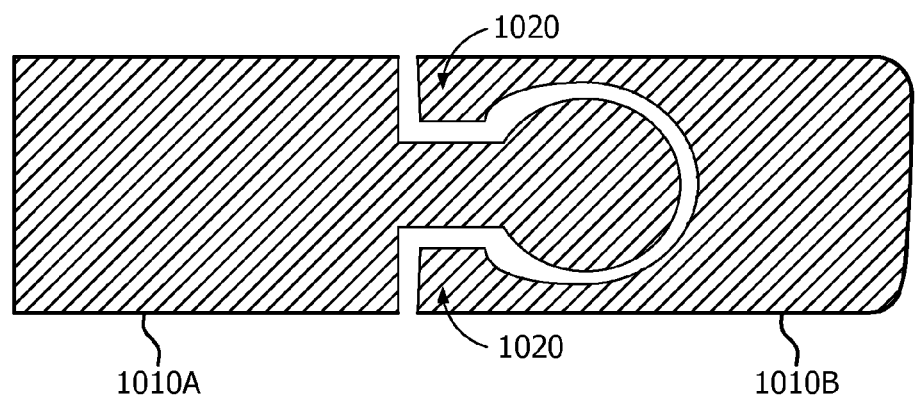
FIG. 10 shows a top view of snap-in puzzle-like segments.

In yet another exemplary and non-limiting embodiment, the edges of the segments form a snap-in profile as illustrated in FIG. 10. The first edge, for example, edge 1010A, comprises an essentially rounded head portion. The second edge, for example edge 1010B, comprises an outer profile that forms a spring-like connector 1020 to allow a snap-in connection between edge 1010A and edge 1010B. Alternatively, the electrically insulating layer can be made thicker and elastic to achieve the snap-in spring function.

Other solutions are also possible without departing from the scope of the invention. For example, and without limitation, the segments may be mechanically connected by hinges. This is especially advantageous if the segments are connected to a rail system as explained in more detail hereinbelow. In another embodiment, the segments are mechanically connected by an intermediate connection segment. The intermediate connection segments can be connected to the electrode segments by any one of the previously described solutions. Preferably, the intermediate segment provides electrical insulation, so that the electrode segments can be manufactured completely from metal without additional electrical insulation.

Figure 11:
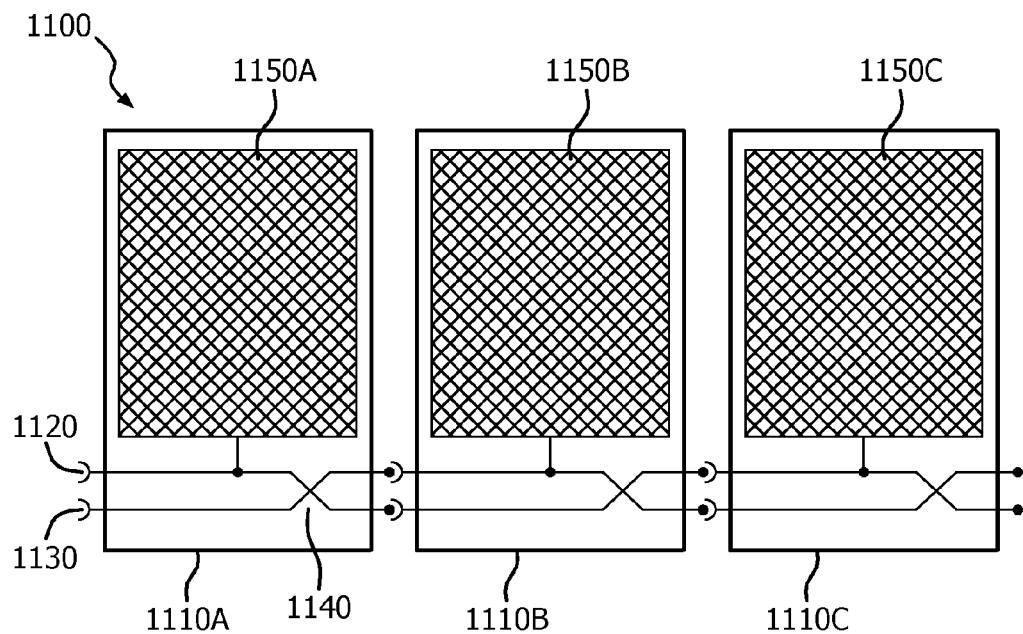
FIG. 11 shows a view of an electric connection with integrated connections and connectors.

Electrical connectivity between segments can be achieved with an integrated connectivity solution within the conducting segments. FIG. 11 shows an exemplary and non-limiting embodiment 1100 of an electric connection with integrated connections and connectors. A plurality of segments 1150A, 1150B, and 1150C have integrated connection lines 1120 and 1130 that crossover at point 1140 without an electrical connection at the intersection point 1140. The connection lines 1120 and 1130 provide the power supply connectivity to the segments. The wire 1120 is electrically connected to the segment 1150A.

When two segments are mounted adjacent to each other, their corresponding segments are connected to different electrical connection lines. For example, in FIG. 11, the center segment 1150B of 1110B is connected in fact to a different connection line (i.e., connection line 1130) than the segments 1150A and 1150C (i.e., connection line 1120). As a result, the segments alternate in polarity, thereby providing the different electrodes discussed in more detail with respect of FIG. 1 hereinabove.

Figure 12:
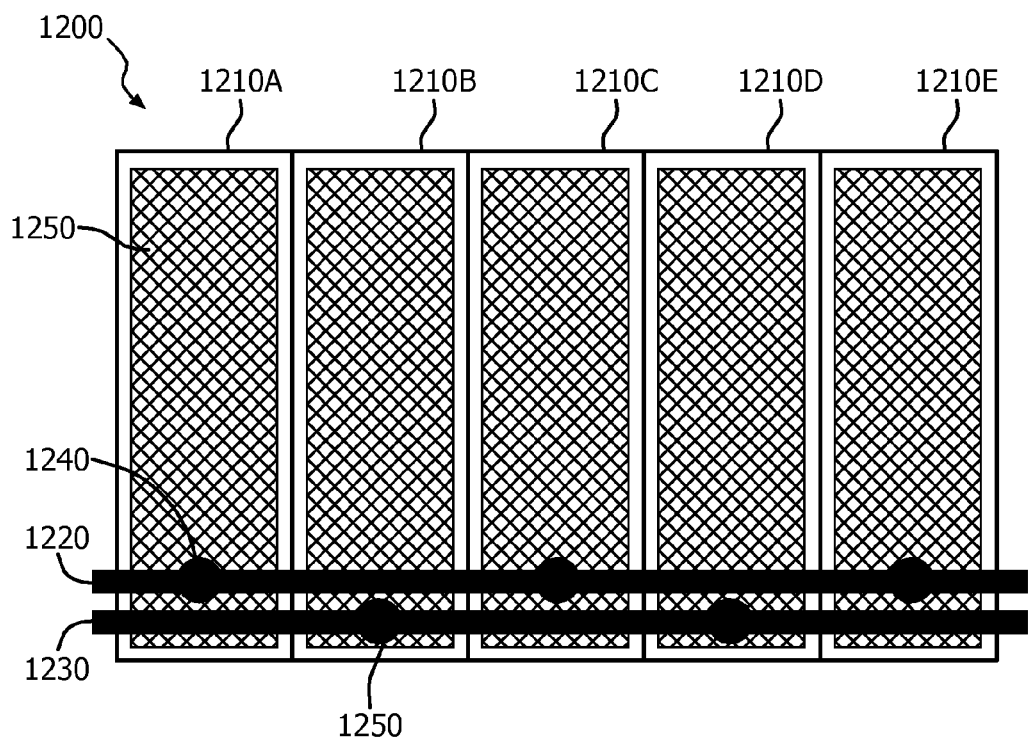
FIG. 12 shows a view of an electrical interconnection with orthogonally mounted interconnection elements.

FIG. 12 depicts an alternative exemplary and non-limiting embodiment of an electrical interconnection 1200 with orthogonally mounted interconnection elements. The electrodes 1250 of segments 1210A through 1210E, which preferably are made of an insulating material, are connected alternatively to connection elements (supply lines) 1220, 1230 via contacts 1240. That is, segments 1210A, 1210C and 1210E are connected to supply line 1220, while segments 1210B and 1210D are connected to supply line 1230.

Preferably, the connection elements 1220, 1230 are mounted as foot splint close to the floor or as decorative stripes close to the ceiling. They can be mounted, for example, but not by way of limitation, with screws. In this case, the screws can be used to make the contact to the electrodes of the segments 1210A through 1210E.

In a further embodiment, the connection elements 1220, 1230 are attached by permanent magnets, e.g. using flexible magnets. The connection elements 1220, 1230 may comprise further electronics, for example and without limitation, components to switch on or off unused segments or to generate AC power locally, for example per segment. It should be understood that if an AC signal is generated per segment, the only interconnections between segments are the bus voltages and an optional data signal. The connection elements 1220, 1230 may be rigid or flexible. The connection elements 1220, 1230 may include several parts, which can be put together to form a required length. The connection elements 1220, 1230 may have a recursive structure, such that they can be cut or broken into smaller parts of a desired length. The connection elements 1220, 1230 may further have external marks for locations thereon where they can easily be cut, sawn or broken apart. The connection elements 1220, 1230 may also be referred to, for differentiation purposes, as "positive" and "negative" relating to the relative potential of each.

A person of ordinary skill in the art would readily appreciate that other connection solutions exist without departing from the embodiments disclosed herein, several of which are described herein without the intent to limit the general scope of the invention and solely for illustrative purposes.

Hence, according another embodiment, a rail system may be used where the segments (described above) are mounted on a rail system that consists of two rails, one for each potential. The segments are alternatingly attached to a positive potential rail or a negative potential rail, thereby providing the necessary alternating potential to each segment. In another configuration, only one rail is available. The rail is separated into individual sections, which are electrically insulated from each other, e.g., by non-conducting rail pieces. The segments, realized as rail segments, are alternately connected to a positive potential and a negative potential, each rail sections having a width that is of similar length as the width of the segments. When the segments are in place, they are connected alternately to a positive potential and a negative potential supply.

Yet another configuration involves a hook-like horizontal profile. The hook-like profile includes sections, which are alternatingly connected to a positive potential and a negative potential. In a further configuration, the segments are connected by an intermediate segment, which provides the electrical contacts from one to the next segment. The connection wires can be crossed in the intermediate segment to provide alternating potential on the electrode segments. Contacts can be done in all five solutions, e.g., by conducting screws, spring contacts, rubber contacts, conducting paste, anisotropic conducting paste, pins or nails, hooks, hook-like profiles, rolls or moving contacts.

Figure 13:
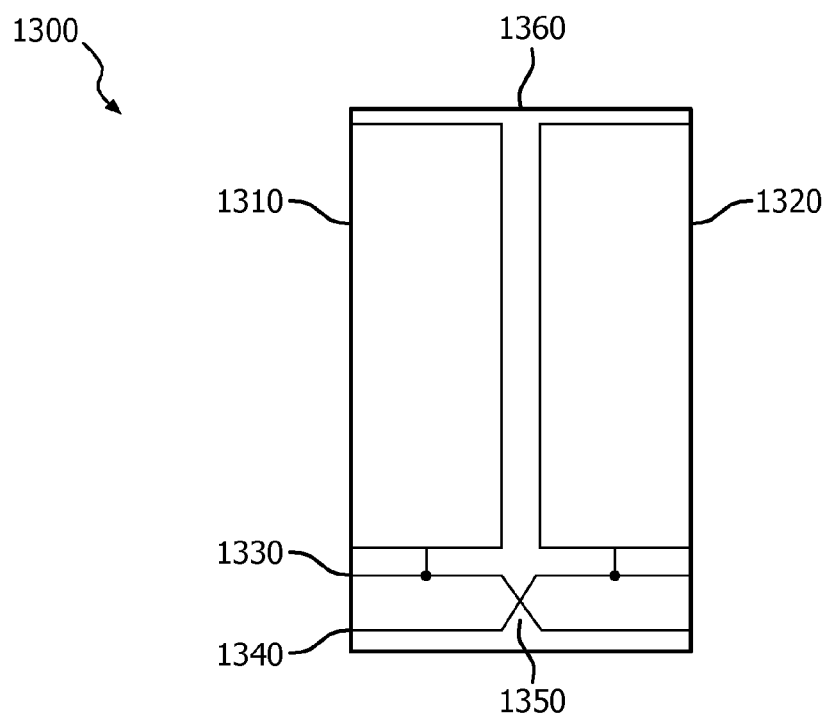
FIG. 13 shows a capacitive coupled element.

FIG. 13 shows an exemplary and non-limiting capacitive coupled element 1300 according to one embodiment. The element 1300 comprises a conducting segment 1310 that is connected to a supply line 1330 and a conducting segment 1320 that is connected to supply line 1340, preferably mounted on an insulating surface 1360. The supply line 1340 crosses over supply line 1330 at crossing point 1350 with no electrical connection between the supply line 1330 and the supply line 1340. While the element 1300 is shown such that the conducting segments 1310 and 1320 have a vertical orientation, a horizontal orientation or other orientations are equally possible and within the scope of the invention.

Figure 14:
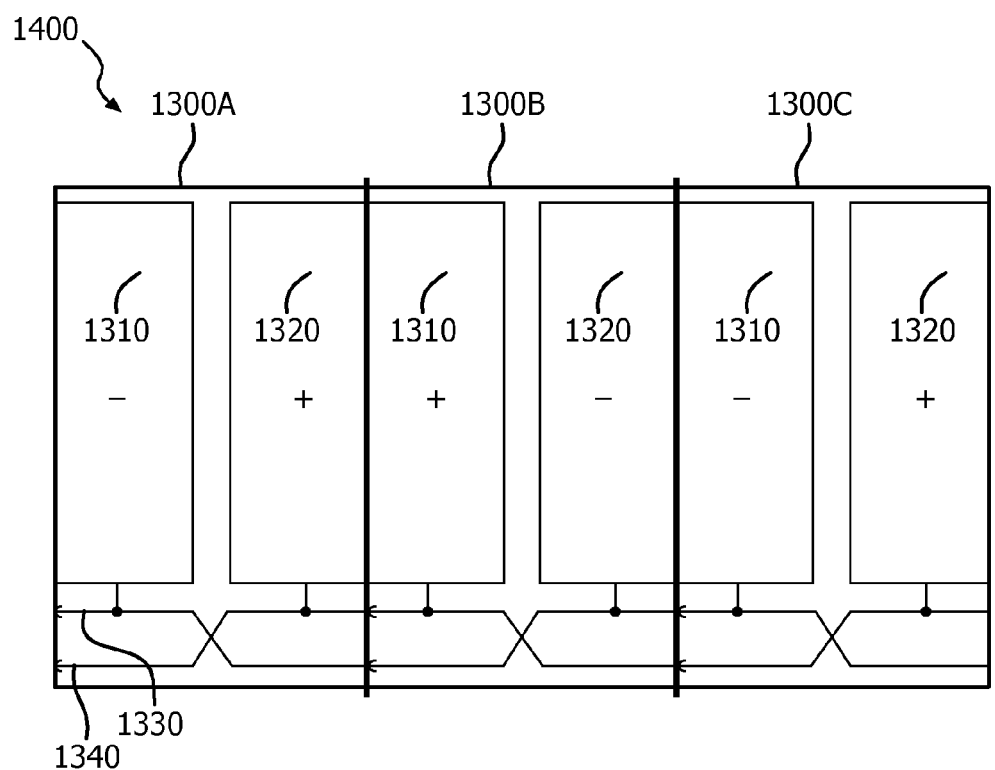
FIG. 14 shows a plurality of interconnected capacitive coupled elements.

In an embodiment, a plurality of capacitive coupled elements is placed abutted with each other, as shown in the exemplary and non-limiting FIG. 14. The capacitive coupled elements 1300A, 1300B and 1300C are abutted along the length of the segments, e.g., segment 1320 of element 1300A abuts with segment 1310 of element 1300B. The supply line 1330 is connected alternatingly to segment 1310 of elements 1300A and 1300C, while supply line 1340 is connected to segment 1310 of element 1300B. Due to the fact that elements 1300A, 1300B and 1300C are abutted to each other, segment 1320 of element 1300A is abutted to segment 1310 of element 1300B and hence also connected to the supply lime 1340.

Likewise, a segment 1320 of an element 1300B is connected to supply line 1330, and element 1300B is abutted to element 1300C. In this example, the power line 1330 is associated with a negative potential, while the power line 1340 is associated with a positive potential. However, this should not be viewed as limiting and the opposite may be equally possible.

In one embodiment, the segments 1310 and 1320 are mounted separate of the connecting power lines. In such an embodiment, vertical abutment of elements containing the segments 1310 and 1320 is possible where at the top or bottom portion (top or bottom are described herein merely to describe opposite ends) of one or more of elements that abut to each other vertically, there is connected an element that contains the power line connections described herein. In this way a complete wall or otherwise any desired surface can be covered using capacitive coupled segments. The advantage is that whatever the height or shape of the surface, it can be covered with these elements (which may also be referred to as tiles).

Persons of ordinary skill in the art would readily realize that the descriptions provided herein are merely for illustration purposes and other embodiments are possible without departing from the scope of the invention. For example, while the description provided is with respect of wallpaper, the invention should not be viewed as limited to wallpaper. Other materials may be used that cover large surfaces, and the surfaces should not be viewed as limited to walls. For example, ceilings, floors, doors, and other surfaces that may be covered by a sheet having embodied therein conductive stripes as discussed herein for the purpose of providing capacitive power transfer are specifically included. Furthermore, while vertical and horizontal conductive paths have been discussed, other layout of the conductive paths, alternating the paths between connection points to the driver, are also possible and are specifically part of the disclosed invention. Such conductive stripes may or may not be evenly spaced. While the wallpaper sheets may have an insulating layer that is paper, other materials such as but not limited to polymers of all sorts may also be used.

Furthermore, in one embodiment, rather than embedding the conductive stripes at the back of the wallpaper, the conductive stripes may be embedded, or otherwise printed over, the front side of the wallpaper. In such a case the insulating layer must be placed on the electrodes of the receiver. In yet another embodiment of the invention, rather than using flexible materials for a wallpaper solution, relatively rigid bodies such as gypsum wall or surfaces, high pressure laminate, glass, or medium-density fiberboard (MDF) to which the conductive layers are properly embedded are also part of the invention disclosed herein. Furthermore, in one embodiment of the invention woven wallpaper is used into which the conductive stripes are woven in.

In one embodiment of the invention, regardless of the electrode patterns desired for the creation of a capacitive power transfer system, the electrodes are formed on a sacrificial layer. For example, in FIG. 2 layer 210 may be a sacrificial layer. The conductive stripes 220 are affixed on the surface, for example but not by way of limitation, using an adhesive material, and then the sacrificial layer is peeled off, while the stripes 220 remain on the surface. The stripes 220 may then, if desired, be coated by a layer of paint, a regular wallpaper, etc. to create any desired decorative effect, but including, leaving the stripes 220 exposed.

In another embodiment, a conductive layer for a large surface for distribution of power using capacitive power transfer can be realized as a multi-electrode layer, illustrated in an exemplary and non-limiting FIG. 15. A multi-electrode layer 1500 includes at least two conductive layers 1510, 1511 isolated from each other using insulating layers 1521, 1522, and 1523. Specifically, each conductive layer is covered with two insulating layers. The insulating layers 1521, 1522, and 1523 are made of a non-conductive material.

In this particular embodiment, the multi-electrode layer 1500 is wallpaper where the insulating layers 1521, 1522, and 1523 are paper, while the conductive layers 1510, 1511 are made of flexible conductive material, e.g., an aluminum foil. Other conductive materials that can be utilized for the layers 1510 and 1511 include, but are not limited to, iron, steel, indium tin oxide (ITO), organic material, such as PEDOT, copper, silver, conducting paint, conducting ink, or any conductive material. Each of the conductive layers 1510 and 1511 can be printed on each of the insulating layers 1521, 1522 and 1523.

The multi-electrode layer 1500 can be also implemented as a rigid surface, such as, but not limited to, medium-density fiberboard (MDF), cardboard, foam broad, plasterboard, and the like.

The conductive layers 1510, 1511 can cover the entire surface or constructed as different patterns. In one embodiment, each of layers may include a plurality of conductive stripes. An exemplary arrangement of one layer of the multi-electrode layer 1500 using conductive stripes is provided in FIG. 2. In another embodiment, each of layers 1510, 1511 is designed to include conductive stripes arranged as a grid. In yet another embodiment, each of layers 1510, 1511 can be designed to include conductive stripes arranged as a comb-shape.

It should be noted that the conductive stripes of layers 1510, 1511 can be arranged in any pattern or geometric shape to form the system transmitter electrodes. It should be further noted that as the conductive layers 1510, 1511 are isolated from each other conductive stripes from different conductive layers are electrically insulated from each other.

In one embodiment, the conductive layers 1510, 1511 form the transmitter electrodes of a capacitive power transfer system. Accordingly, to power a load of the system, the conductive layers are connected to a power driver of the system. As schematically illustrated in FIG. 15, the layers 1510, 1511 are connected to conducting lines 1551, 1552 of the power driver 1550. The polarity of the electric potential on each of the lines 1551, 1552 is opposite to each other. The connection between the conductive layers 1510, 1511 and the power driver 1550 may be by means of a galvanic contact or a capacitive coupling.

The multi-electrode layer 1500 may be customized and yet still allow conductivity of the electrodes, for example, to the power driver. For example, as illustrated in FIG. 16, a sheet of a multi-electrode layer 1600 manufactured as wallpaper can be mounted around a window 1650. As can be noticed, after cutting part of the multi-electrode layer 1600, a customized layer 1600A includes both conductive layers 1611 and 1612. Therefore, in the customized layer 1600A the conductive layers 1611 and 1612, acting as the transmitter electrodes, can be properly connected to a power driver (not shown in FIG. 16) of a capacitive power transfer system.

While the present invention has been described at some length and with some particularity with respect to the several described embodiments, it is not intended that it should be limited to any such particulars or embodiments or any particular embodiment, but it is to be construed with references to the appended claims so as to provide the broadest possible interpretation of such claims in view of the prior art and, therefore, to effectively encompass the intended scope of the invention. Furthermore, the foregoing describes the invention in terms of embodiments foreseen by the inventor for which an enabling description was available, notwithstanding that insubstantial modifications of the invention, not presently foreseen, may nonetheless represent equivalents thereto.

What is claimed is:

1. An article of manufacture for supplying a power to a load connected in a capacitive power transfer system, comprising:
   a sheet of a non-conductive material; and
   a plurality of conductive stripes, embodied in the sheet, each conductive stripe being electrically insulated from each other conductive stripe, wherein the sheet forms an insulating layer of the capacitive power transfer system and the plurality of conductive stripes form at least a pair of transmitter electrodes of the capacitive power transfer system, wherein a first set of stripes of the plurality of conductive stripes is connected to a first potential via a first conducting line embodied in the sheet, and the second set of stripes of the plurality of conductive stripes is connected to a second potential via a second conducting line embodied in the sheet, wherein the plurality of conductive stripes cover a major portion of the surface of the sheet.

2. The article of manufacture of claim 1, wherein the sheet material is any one of: a wallpaper, gypsum, a polymer sheet, high pressure laminate, glass, medium-density fiberboard (MDF), and a sacrificial layer.

3. The article of manufacture of claim 1, further having an interface for connecting to a baseboard, the baseboard comprising a first conducting line connected to the first conductive stripe and a second conducting line connected to the second conductive stripe.

4. The article of manufacture of claim 1, further comprising a protective layer coating the plurality of conductive stripes.

5. The article of manufacture of claim 1, wherein a power signal generated by a power driver is wirelessly transferred from the pair of transmitter electrodes coupled to the insulating layer to a pair of receiver electrodes connected to the load and an inductor to power the load when a frequency of the power signal substantially matches a series-resonance frequency of the inductor and the capacitive impedance formed between the pair of transmitter electrodes and the receiver electrodes.

6. The article of manufacture of claim 1, wherein the conductive stripes comprise one of: conductive ink, conductive paint.

7. An article of manufacture for supplying a power to a load connected in a capacitive power transfer system, comprising:
   an insulating surface having a width and a length, the insulating surface further having a first edge, defining a first boundary of the insulating surface, and a second edge, defining a second boundary of the insulating surface, wherein the second edge is opposite the first edge;
   a first segment made of an electricity conducting material affixed to a length of the first edge of the insulating surface;
   a second segment made of an electricity conducting material affixed to a length of the second edge of the insulating surface, the second segment being electrically isolated from the first edge, wherein the first segment is connected to an electric potential of a first polarity and the second segment is connected to an electric potential of a second polarity that is opposite to the first polarity, wherein the first and second segments form at least a pair of transmitter electrodes of the capacitive power transfer system.

8. The article of manufacture of claim 7, further comprising a first supply line and a second supply line wherein the first supply line is connected to the first segment, and wherein the first line and second line intersect without electrically connecting.

9. The article of manufacture of claim 7, wherein the first segment and the second segment are made of any one of: Iron, Steel, and Aluminum.

10. An article of manufacture for supplying a power to a load coupled to a capacitive power transfer system, comprising:
    an insulating surface;
    a segment made of an electricity conducting material affixed to the insulating surface, the segment forming a first electrode of a transmitter of the capacitive power transfer system;
    a first supply line connected to the segment; and
    a second supply line, wherein the first supply line and second supply line intersect without electrically connecting, such that the first supply line and second supply line crossover, wherein the first supply line and second supply line reach a boundary of the insulating surface, to allow for an alternate potential connection to another segment of an abutting article of manufacture for supplying a power grid for a capacitive power, the other segment forming a second electrode of the transmitter of the capacitive power transfer system.

11. An article of manufacture for supplying a power to a load coupled to a capacitive power transfer system, comprising:
    an insulating surface;
    a first segment made of an electricity conducting material affixed to the insulating surface, the first segment forming a first electrode of a transmitter of the capacitive power transfer system;
    a second segment made of an electricity conducting material affixed to the insulating surface, the second segment forming a second electrode of a transmitter of the capacitive power transfer system;
    a first supply line running over the first segment and the second segment, and having a first contact to the first segment, wherein a connection is made between the first contact and the first segment, the first segment operating as a first electrode of a transmitter of the capacitive power transfer system; and
    a second supply line running over the first segment and the second segment, and having a second contact to the segment, wherein a connection is made between the second contact and the second segment, the second segment operating as a second electrode of the transmitter of the capacitive power transfer system.

12. An article of manufacture for supplying a power to a load connected in a capacitive power transfer system, comprising:
    a plurality of insulating layers made of a non-conductive material; and
    at least a pair of conductive layers made of an electricity conducting material, wherein the plurality of conductive layers are arranged in a stacked configurations and are isolated from each other by one of the plurality of insulating layers, wherein a first conductive layer of the pair of conductive layers comprises a plurality of conductive stripes and is connected to an electric potential of a first polarity and a second conductive layer of the pair of conductive layers comprises a plurality of conductive stripes and is connected to an electric potential of a second polarity that is opposite to the first polarity, wherein the pair of conductive layers form at least a pair of transmitter electrodes of the capacitive power transfer system.

13. The article of manufacture of claim 12, wherein the non-conductive material and the electricity conducting material are flexible materials.

* * * * *